(No Model.) 2 Sheets—Sheet 1.

E. D. STARKE.
PLOW.

No. 295,952. Patented Apr. 1, 1884.

Attest:
Court A. Cooper
Franklin H. Hough

Inventor:
Edwin D. Starke
by Wm. F. Henderson
Attorney (No Model.) 2 Sheets—Sheet 2.
E. D. STARKE.
PLOW.
No. 295,952. Patented Apr. 1, 1884.
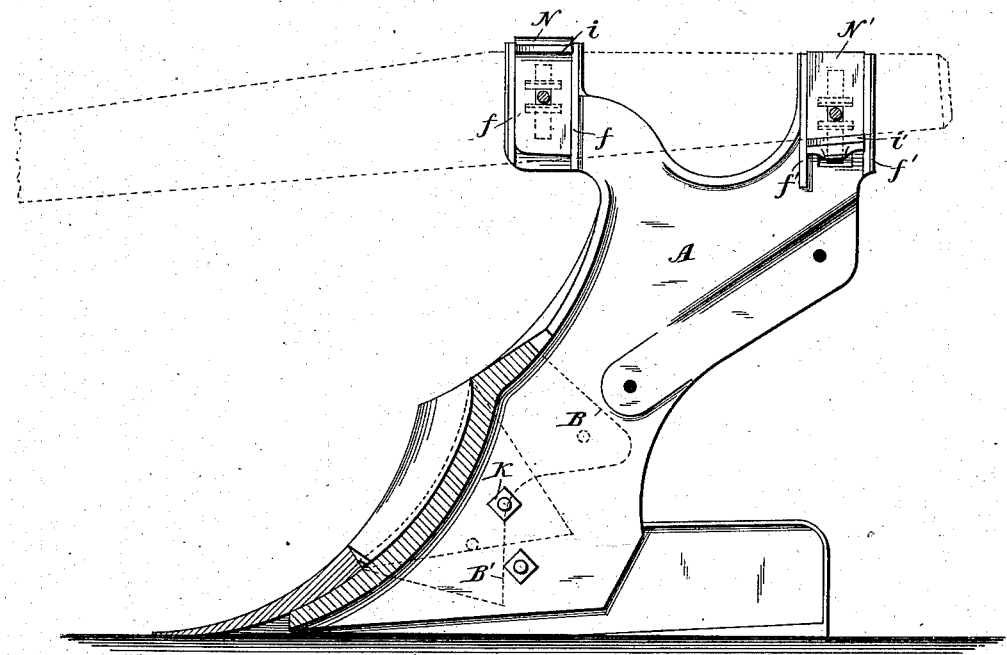
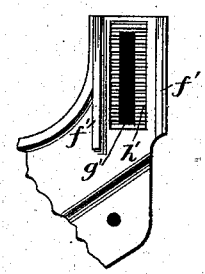
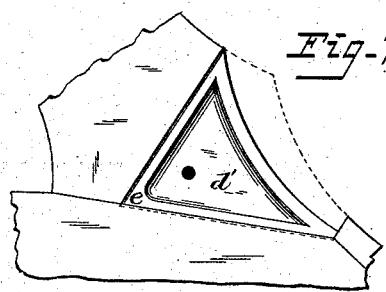
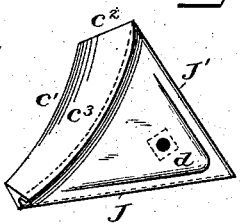
Attest:
Court A. Cooper
Franklin H. Hough
Inventor:
Edwin D. Starke
by Wm. F. Henderson
Attorney

UNITED STATES PATENT OFFICE.

EDWIN D. STARKE, OF RICHMOND, VIRGINIA.

PLOW.

SPECIFICATION forming part of Letters Patent No. 295,952, dated April 1, 1884.

Application filed December 31, 1883. (No model.)

*To all whom it may concern:*

Be it known that I, EDWIN D. STARKE, a citizen of the United States, residing at Richmond, in the county of Henrico and State of Virginia, have invented certain new and useful Improvements in Plows; and I do hereby declare the following to be a full, clear, and exact description of the invention, such as will enable others skilled in the art to which it appertains to make and use the same.

Figure 1:
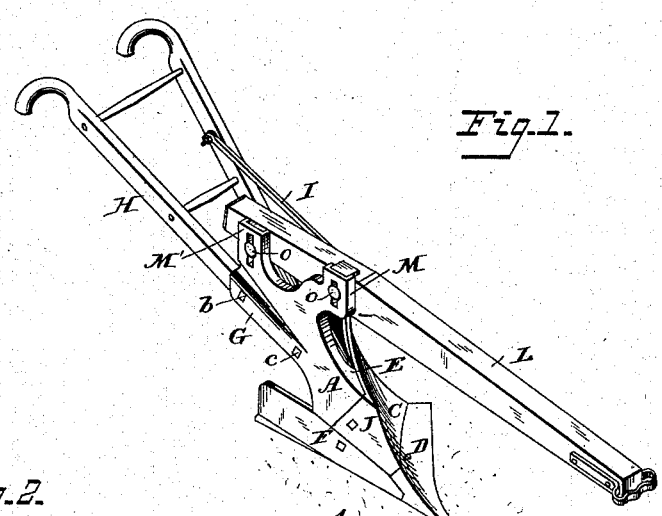
Figure 2:
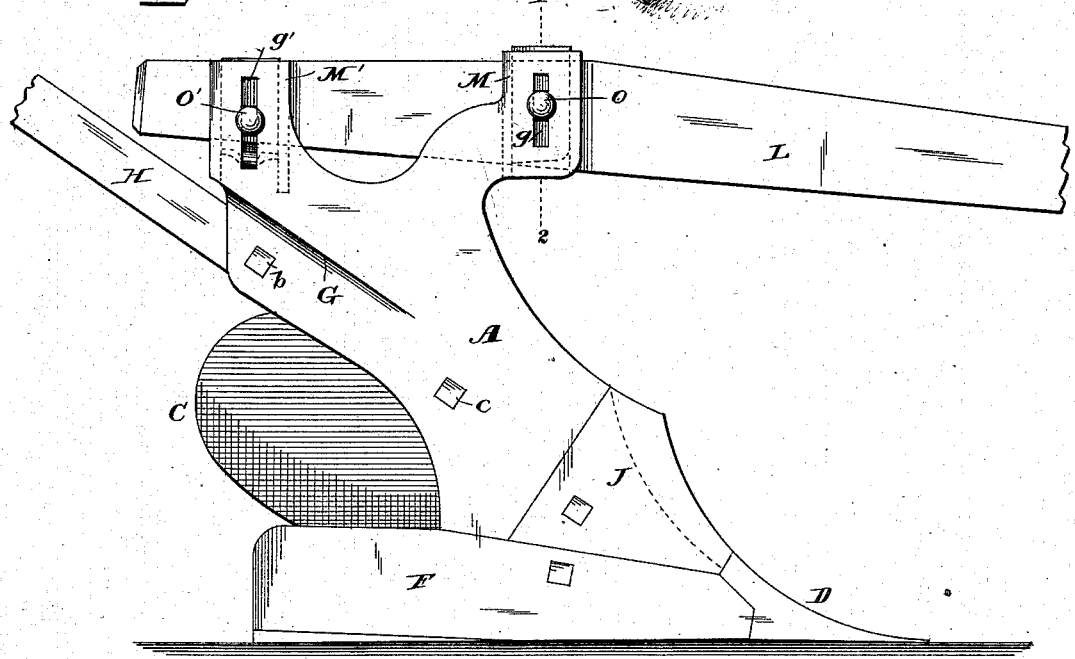
Figure 4:
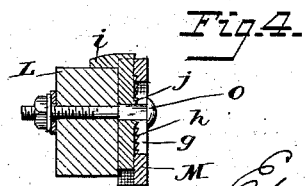

Figure 1 is a perspective of my improved plow; Fig. 2, a side elevation with a part of the handles broken away; Fig. 3, a similar view from the mold-board side, with the point and mold-board in section. Fig. 4 is a cross-section through the beam and forward adjusting devices. Fig. 5 is a side view of a portion of the standard, showing the slot and serrations or notches for the engagement of the adjusting-plates. Fig. 6 is a side view of the landside-cutter. Fig. 7 is a side view from the land side of the plow, showing the recess and depression therein for the reception of the landside of the cutter; and Fig. 8 is a perspective of the rear adjusting-plate.

My invention relates to plows, and has for its object, mainly, to provide for raising and lowering the beam to increase or decrease the depth of furrow without altering the set of the castings or plow proper or interfering with the level running of the plow, and also to compel the plow to run level by adjustment of the beam.

In the accompanying drawings, the letter A designates the standard, which inclines rearwardly, as shown, and is formed with wings, B B', as shown in dotted lines, Fig. 3, for the attachment thereto by bolts of the mold-board C and point and share D, and also formed at its throat with the flange E, which extends toward the furrow side with its face inclining rearwardly, so as to direct weeds and trash backwardly into the furrow. The landside of the plow is recessed to receive the landside-bar F, and is formed with the socket G to receive one of the handles H, which is bolted thereto at one point by a bolt, $b$, and at another point by a bolt, $c$, which last bolt also secures the other handle to the standard at the same point. The handles are braced by the rod I, connecting them with the beam. The large space between the mold-board and bottom of the beam prevents choking at that point.

The cutter J is fitted to the front edge of the standard, as shown, and is formed with a concave cutting-edge, $c'$, with a curved top edge, $c^2$, to meet the curve of the standard, with a beveled or inclined face, $c^3$, next to and meeting with the mold-board, and with a landside-wing, J', preferably of the form shown, provided on its inner face with a swell or shoulder, $d$. This landside-wing fits into a recess, $e$, made in the standard, so as to bring its outer face flush with the face of the standard and that of the landside-bar, and the swell or shoulder $d$ fits into a depression, $d'$, made in the standard inside the recess $e$, so that by said shoulder a tighter, closer, and stronger union will be effected between the wing and standard. A bolt, K, passed through the wing and standard from the landside, with a nut on its threaded end, secures the cutter to the standard.

In use that portion of the landside of the plow described by the wing J' wears out before the other parts thereof, and therefore it is desirable to have the parts constructed so that the worn-out portions can be replaced, and the evenness of the surface thus restored. The construction I have shown and described I consider the best for that purpose.

The beam L is attached to the standard by means which permit it to be raised and lowered or adjusted vertically on the standard without altering its angle to a perpendicular line, assuming the plow to be running level, thereby increasing or decreasing the depth of the furrow without altering the set of the castings, or, in other words, without interfering with the level of the plow. While the beam is allowed such vertical adjustment, the means by which it is accomplished also permit the angle of the beam to a perpendicular to be altered, so that if, for any reason, the plow be not running level, the beam can be adjusted on the standard so as to force it to run level. Thus, if the plow be running on its point, with its heel elevated, the beam will be lifted or raised at the forward part of the standard, and also raised or lifted at the rearward part of the standard, say, twice the distance it is raised at the other point, thereby raising the point and lowering the heel, and thus causing the plow to run level. On the other hand, if the plow be running on its heel, with the point elevated, the beam at the rear part of the standard will be dropped or lowered, and at the forward part will be lowered or dropped, say, one-half the distance it is lowered at the rear part, thereby raising the heel and lowering the point, and thus causing the plow to run level.

The construction which I consider the best for effecting the above results consists in forming the standard at its top with two extensions, M and M', each having side flanges, $f$ $f'$, to form grooved ways, and the former with a vertical slot, $g$ $g'$, and transverse serrations or ratchet-teeth $h$ $h'$. The teeth of one extension are on the same horizontal line as the teeth of the other extension, and the teeth of the front extension, M, preferably incline on their under faces and form a flat bearing-surface on their upper faces, because the weight of the beam bears down on these teeth, while the teeth to the rear extension, M', are formed just the reverse way, because the rear part of the beam is pressed upwardly. Two plates, N and N', formed, respectively, with the flanges $i$ $i'$, with teeth $j$ $j'$ (preferably V-shaped) on the opposite side, and bolt-holes between the teeth, fit in the grooved ways of the two extensions, and serve to adjust the beam to the standard, the rear of the beam resting on the flange $i'$ of the plate N', and the top of the beam fitting under the flange $i$ of the plate N. The beam is clamped to these plates and the plates to the standard by means of bolts O O', passed through the several parts, and having nuts and washers, the heads of the bolts being large enough to extend across the slots in the standard's extensions, as shown in Figs. 1 and 2 of the drawings. By such construction the beam can be raised or lowered at both points of attachment by loosening the bolts and raising or lowering both plates the same distance and then tightening the bolts, so as thereby to change the draft, and consequently the depth of furrow, without altering the set of the castings or interfering with the level running of the plow. If the plow be running on its point, with the heel elevated, the beam can be raised, say, one notch at the forward extension, and raised, say, two notches at the rear extension, so as to lift the point and lower the heel, and thereby compel the plow to run level. If the plow be running on its heel, with the point elevated, the beam at the rear extension can be lowered, say, two notches, and at the forward extension lowered one notch, and the plow thus forced to run level. Of course, the beam can be raised and lowered a greater number of notches, if necessary. It will thus be seen that the beam can be adjusted vertically on the standard without altering its angle to a perpendicular, so as to cut a deep or shallow furrow, as described, and also that by the same means of adjustment the beam can be dropped or lifted at one point of attachment, and also dropped or lifted at another point to the same or a greater or less extent, so as to compel the plow to run level, and in such features the method of adjustment of the beam on the standard differs from that where the beam has a pivotal adjustment—that is, where the beam is pivoted at one point and admits of being tilted or turned on the pivot. The adjustment can be made easily, quickly, and with accuracy, and the running of the plow brought under the complete control of the plowman, and the plow will run easier and will last longer, since the parts will be made to wear evenly and together.

I am aware that it has been proposed to provide means for adjusting the plow vertically and to an inclination, also to provide a plow with a cutter having a landside-wing. I lay no claim to such means, broadly, but only to my improved means for effecting such results.

Having described my invention and set forth its merits, what I claim is—

1. In a plow, the combination of the standard, slotted for the passage of a bolt and provided with transverse ratchets at both the front and rear portions of its upper end, and the vertically-adjustable ratchet-plates adapted to engage with the front and rear ratchets of the standard, substantially as and for the purpose set forth.

2. In a plow, the combination of the standard, having at both the front and rear portions of its upper end grooved ways slotted for the passage of a bolt and provided with transverse ratchet-teeth, the flanged ratchet-plates fitting in said grooved ways and vertically adjustable therein, the flange of one plate fitting above and the flange of the other beneath the beam, and bolts for securing the parts together, substantially as and for the purpose set forth.

In testimony whereof I affix my signature in presence of two witnesses.

EDWIN D. STARKE.

Witnesses:
JOHN F. MEREDITH,
AUSTIN BROCKENBROUGH.